United States Patent
Steele et al.

(10) Patent No.: US 9,285,581 B2
(45) Date of Patent: Mar. 15, 2016

(54) OPTICAL SCANNING DEVICES AND SYSTEMS

(71) Applicant: Quartus Engineering Incorporated, San Diego, CA (US)

(72) Inventors: Bradley Charles Steele, San Diego, CA (US); Graham Cross Nelson, San Diego, CA (US); William Clifton, Melbourne, FL (US)

(73) Assignee: Quartus Engineering Incorporated, San Diego, CA (US)

( * ) Notice: Subject to any disclaimer, the term of this patent is extended or adjusted under 35 U.S.C. 154(b) by 15 days.

(21) Appl. No.: 14/338,242

(22) Filed: Jul. 22, 2014

(65) Prior Publication Data

US 2015/0029571 A1    Jan. 29, 2015

Related U.S. Application Data (60) Provisional application No. 61/858,393, filed on Jul. 25, 2013.

(51) Int. Cl.
| | |
|---|---|
| *G02B 26/08* | (2006.01) |
| *G02B 26/10* | (2006.01) |
| *G01S 7/481* | (2006.01) |

(52) U.S. Cl.
CPC ........... *G02B 26/0883* (2013.01); *G01S 7/4817* (2013.01); *G02B 26/108* (2013.01); *G01S 7/4812* (2013.01)

(58) Field of Classification Search
CPC .............. G02B 26/10; G02B 26/125; G02B 2006/5098; G02B 26/24; G02B 26/0883; G02B 26/0891; G02B 26/106; G02B 26/108
USPC .......... 359/201.1, 205.1, 209.1, 211.1, 211.2, 359/566, 694
See application file for complete search history.

(56) References Cited

U.S. PATENT DOCUMENTS 3,941,451 A * 3/1976 Humphrey ........... G02B 27/646
                                                                  359/557
8,400,700 B2    3/2013 Adams et al.

FOREIGN PATENT DOCUMENTS

| WO | WO 01/75506 | 10/2001 |
|---|---|---|
| WO | WO 2013/025404 | 2/2013 |

OTHER PUBLICATIONS

Ayers, et al., "Holographic Optical Beam-Steering (HOBS)," A Major Qualifying Project Report Submitted to the faculty of Worcester Polytechnic Institute, Oct. 15, 2010, Worcester, MA, U.S.A.

(Continued)

*Primary Examiner* — Euncha Cherry
(74) *Attorney, Agent, or Firm* — Knobbe Martens Olson & Bear LLP (57) ABSTRACT

Optical scanning devices and systems are disclosed. In one aspect, an optical scanning device comprises a first rotatable optical component and a second rotatable optical component. The first and second optical components are configured to rotate about a common optical axis and further configured to deflect an optical path of light transmitted or received through the optical scanning device. The device further comprises a mounting bracket positioned between the first and second optical components and comprises first and second motor assemblies configured to rotate the corresponding first and second optical components about the optical axis independently of each other. An inner portion of each of the first and second optical components is mounted to an outer portion of the corresponding first and second motor assemblies such that the optical axis is configured to extend through the center of the first and second optical components and tubes.

25 Claims, 6 Drawing Sheets

(56) References Cited

OTHER PUBLICATIONS

Heinrichs, et al., "Three-Dimensional Laser Radar with APD Arrays," MIT Lincoln Laboratory, SPIE 4377, 2001, pp. 106-117, Lexington, MA, U.S.A.

Marino, et al., "Jigsaw: a foliage-penetrating 3D imaging laser radar system," Lincoln Laboratory Journal, 2005, vol. 15(1), pp. 23-36, U.S.A.

* cited by examiner

OPTICAL SCANNING DEVICES AND SYSTEMS

CROSS REFERENCE TO RELATED APPLICATIONS

This application claims priority under 35 U.S.C. §119(e) to U.S. Provisional Patent Application No. 61/858,393 entitled "OPTICAL SCANNING DEVICES AND SYSTEMS" filed on July 25, 2013 the disclosure of which is hereby incorporated by reference in its entirety.

BACKGROUND

Field of the Application

The present application relates generally to optical scanning devices and systems.

SUMMARY

Certain embodiments described herein provide an optical scanning device comprising a first rotatable optical component and a second rotatable optical component. The first and second optical components are configured to rotate about a common optical axis. The first and second optical components are further configured to deflect an optical path of light transmitted or received through the optical scanning device. The device comprises a mounting bracket positioned between the first and second optical components. The device comprises first and second motor assemblies configured to rotate the corresponding first and second optical components about the optical axis independently of each other. Each of the first and second motor assemblies comprises a motor supported by an outer perimeter of a tube. Each of the tubes is fixed relative to the first and second optical components. Each of the tubes comprises an inner end supported by the mounting bracket. An inner portion of each of the first and second optical components is mounted to an outer portion of the corresponding first and second motor assemblies such that the optical axis is configured to extend through the center of the first and second optical components and tubes.

Certain embodiments described herein provide an optical scanning system comprising a reflective telescope. The telescope comprises an aperture, first optical surface, and second optical surface. The optical scanning system comprises a receiving device, a transmitting device, and an optical scanning device positioned adjacent the aperture. The optical scanning device comprises first and second optical components configured to steer an optical path of light received within the aperture of the telescope to the first optical surface such that the optical path can be focused at the receiving device by the telescope surfaces. The first and second optical components are configured to rotate about a common axis extending through the center of each of the first and second optical components. Each of the first and second optical components are further configured to be mounted to first and second motor assemblies via a through hole interface extending through the center of each of the first and second optical components.

The paragraphs above recite various features and configurations of one or more of an optical scanning device or an optical scanning system, that have been contemplated by the inventors. It is to be understood that the inventors have also contemplated optical scanning devices or optical scanning systems which comprise combinations of these features and configurations from the above paragraphs, as well as optical scanning devices or optical scanning systems which comprise combinations of these features and configurations from the above paragraphs with other features and configurations disclosed in the following paragraphs.

BRIEF DESCRIPTION OF THE DRAWINGS

Various embodiments are depicted in the accompanying drawings for illustrative purposes, and should in no way be interpreted as limiting the scope of the optical scanning device, systems, or methods described herein. In addition, various features of different disclosed embodiments can be combined with one another to form additional embodiments, which are part of this disclosure. Any feature or structure can be removed, altered, or omitted. Throughout the drawings, reference numbers may be reused to indicate correspondence between reference elements.

DETAILED DESCRIPTION

An optical scanning device as described herein can include a first pair of Risley refractive wedge prisms and/or diffraction gratings that rotate about a common axis in order to deflect (e.g., scan, bend, steer, refract) an optical path (e.g., light, laser, x-ray, microwave, wide-band) within a region (e.g., conical). In some embodiments, the prisms and/or gratings are mounted to one or more independent hubs located or positioned near the axis of rotation that house the support bearings and drive motors. In some embodiments, a central portion of the hub or hubs (e.g., tubes) is clear or hollow so that a separate second optical path of light may be scanned via a second pair of prisms and/or gratings (similar to the first pair of prisms and/or gratings) mounted to outer ends of the hubs. In certain embodiments, supporting the prisms centrally by the hub increases achievable prism and/or grating rotation speed while reducing overall mass, power, and waste heat compared to scanner architecture or devices having prisms/gratings that are supported around their perimeters.

FIGS. 1A-1D schematically illustrate an example optical scanning device 15 in accordance with certain embodiments described herein. In some embodiments, the optical scanning device 15 comprises a first rotatable optical component 1A and a second rotatable optical component 1B. The first and second optical components 1A, 1B may be configured to rotate about a common optical axis (indicated by the broken line 13). In other embodiments, the first and second optical components 1A, 1B may be configured to rotate about different optical axes. The first and second optical components 1A, 1B are further configured to deflect an optical path of light (indicated by arrows 2) transmitted or received through the optical scanning device 15. The optical scanning device 15 further comprises a mounting bracket 6 positioned between the first and second optical components 1A, 1B. The optical scanning device 15 further comprises first and second motor assemblies 17A, 17B configured to rotate the corresponding first and second optical components 1A, 1B about the optical axis 13 independently of each other. Each of the first and second motor assemblies 17A, 17B comprises a motor 3A, 3B each comprised of a rotor and stator. The motor assemblies 17A, 17B are supported by an outer perimeter of a tube 5A, 5B (e.g., hub, housing) and bearings to define the axis of rotation. Each of the tubes 5A, 5B is fixed relative to the first and second optical components 1A, 1B and hence rotate with respective optical components and the motor rotor. Each of the tubes 5A, 5B comprises an inner end 19A, 19B supported by the mounting bracket 6. An inner portion of each of the first and second optical components 1A, 1B is mounted to an outer portion of the corresponding first and second motor assemblies 17A, 17B (e.g. rotor) via a bearing set such that the optical axis 13 is configured to extend through the center of the first and second optical components 1A, 1B and tubes 5A, 5B.

In some embodiments, the mounting bracket 6 comprises a wheel and spoke configuration as illustrated in FIGS. 1A-1D. The spokes can extend to a center hub passage that allows the tubes 5A, 5B to extend through or be mounted to opposite sides of the center hub. The passage is hollow such that a second optical path can pass through the tubes and bracket 6 through the center of the optical components.

Figure 1A:
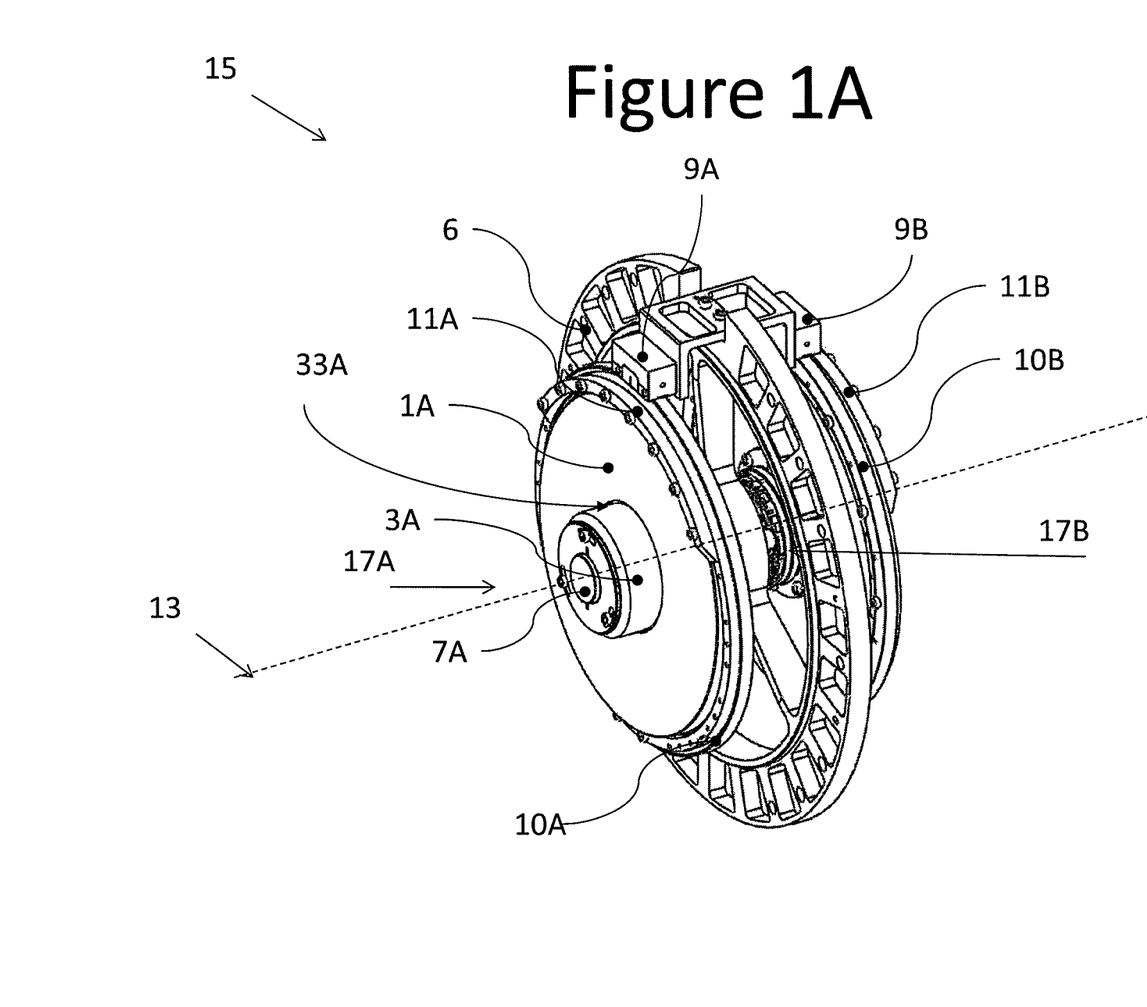
FIG. 1A schematically illustrates a perspective view of an example optical scanner device in accordance with certain embodiments described herein.
Figure 1B:
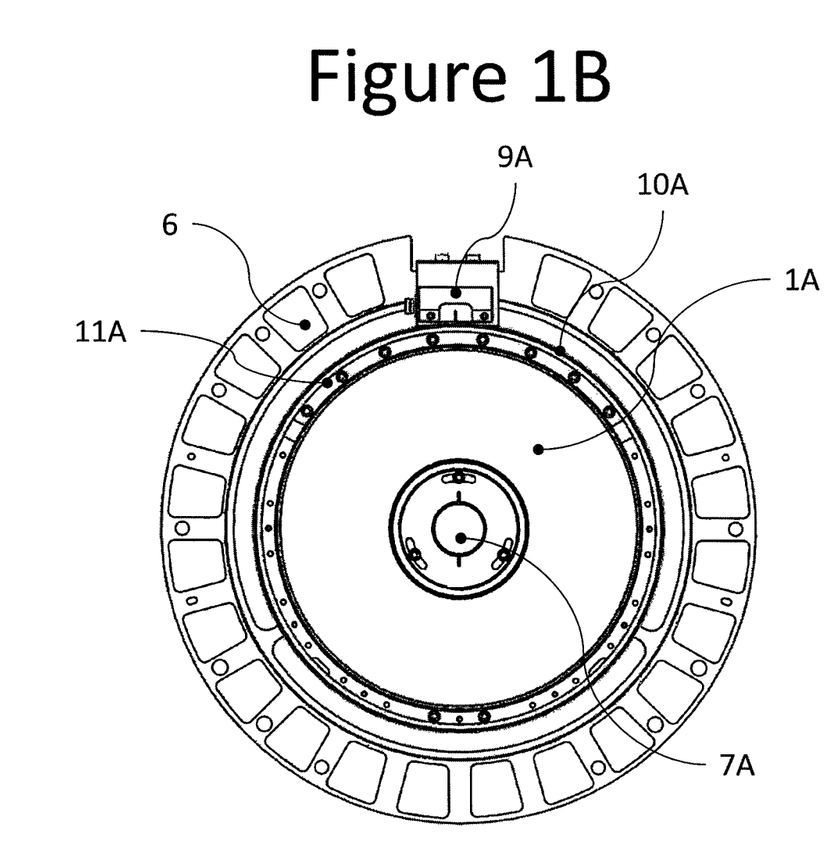
FIG. 1B schematically illustrates a front view of the optical scanner device of FIG. 1A.
Figure 1C:
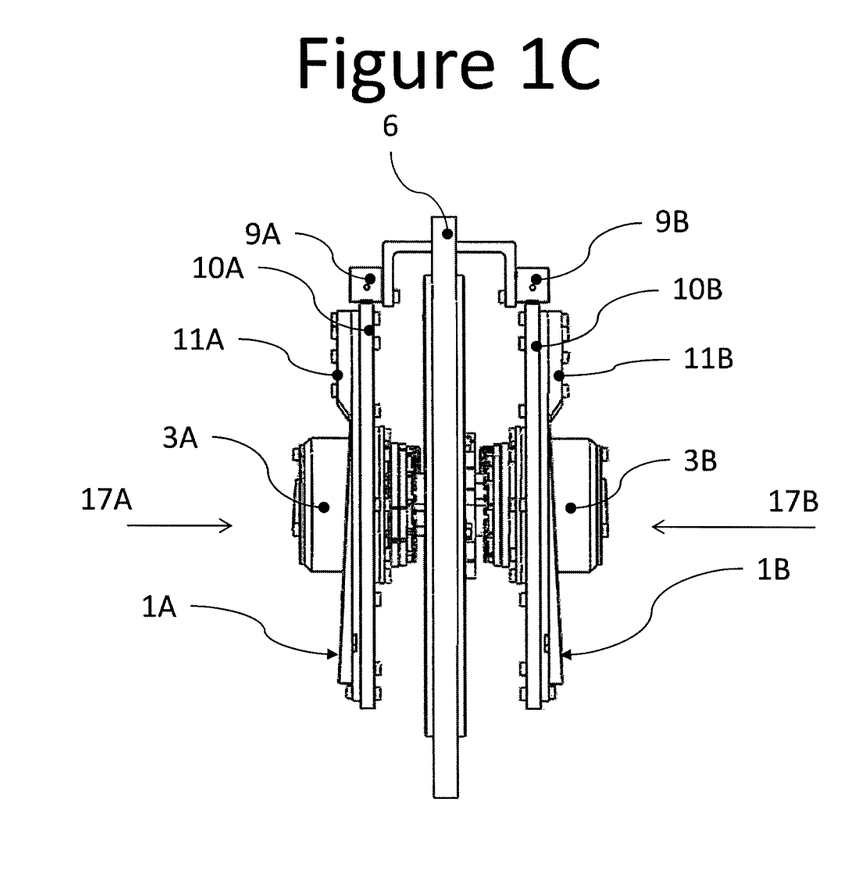
FIG. 1C schematically illustrates a side view of the optical scanner device of FIG. 1A.
Figure 1D:
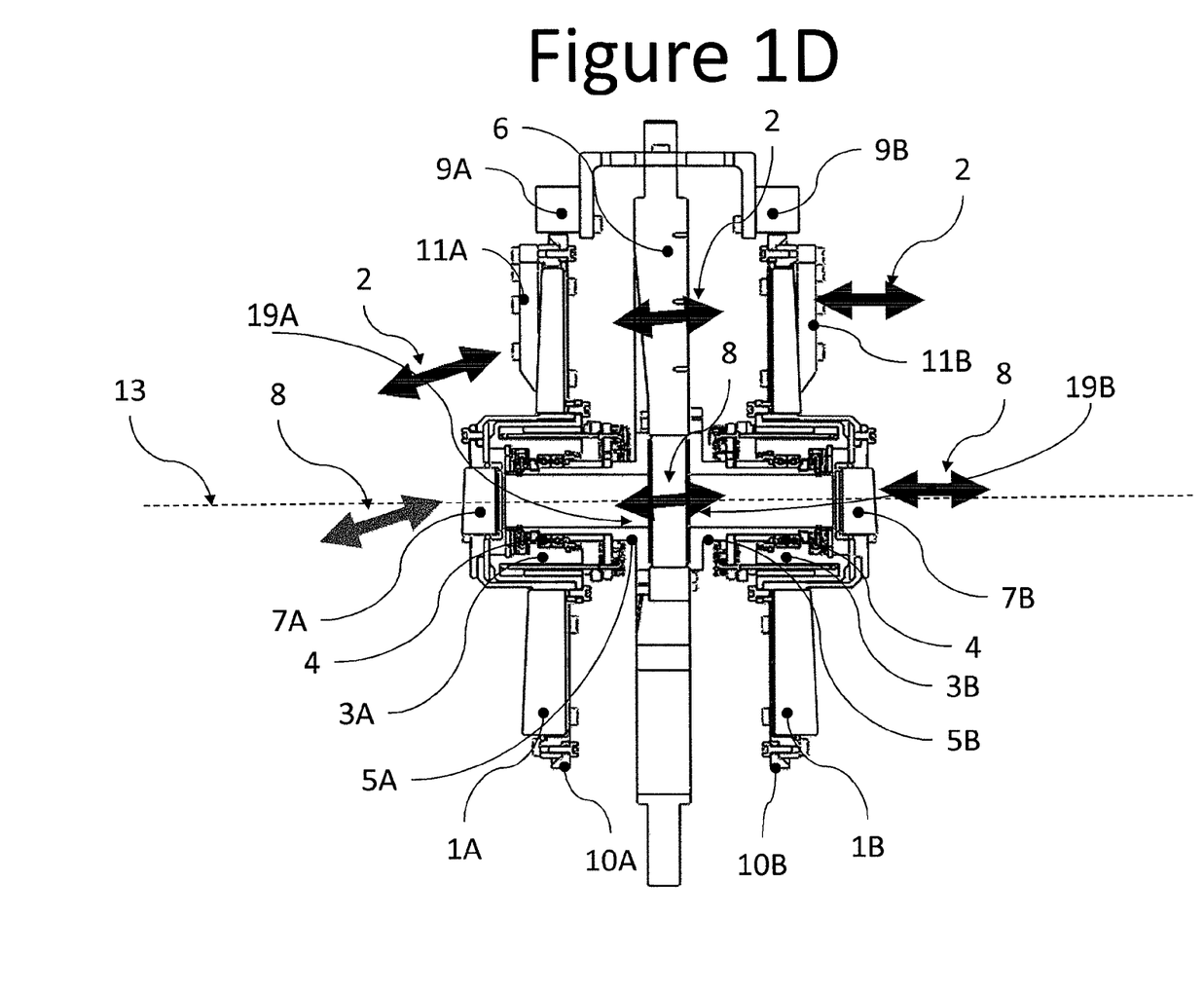
FIG. 1D schematically illustrates a sectional view of the optical scanner device of FIG. 1A.

In certain embodiments, as illustrated in FIG. 1A, the optical scanning device 15 comprises holes 33A, 33B (not shown) (e.g., circular, square, triangular, polygonal) formed (e.g., cored) at a center of each of the first and second optical components 1A, 1B such that an inner diameter of each of the first and second optical components 1A, 1B formed by the holes is configured to be mounted to and supported by an outer diameter of the corresponding motors 3A, 3B of the first and second motor assemblies 17A, 17B. In some embodiments, each of the holes 33A, 33B (not shown) extend through the first and second optical components 1A, 1B from a posterior to an anterior side of the first and second optical components 1A, 1B. The holes 33A, 33B (not shown) can comprise various diameters such that the optical components 1A, 1B can mount to a corresponding motor or motor assembly.

In some embodiments, the optical scanning device 15 comprises third and fourth optical components 7A, 7B mounted to outer ends of the motor assemblies 17A, 17B opposite the inner ends supported by the mounting bracket 6 such that the third and fourth optical components 7A, 7B are rotatable coaxially to (e.g., about the same axis 13) the first and second optical components 1A, 1B. In some embodiments, the third and fourth optical components 7A, 7B are supported by and/or mounted to outer ends of the rotating portions of the motors 3A, 3B. In some embodiments, the third and fourth optical components can be mounted at various angles or offsets relative to the corresponding first and second optical components as discussed in more detail below.

In some embodiments, the third and fourth optical components 7A, 7B comprise materials removed or cored from the each of the first and second optical components 1A, 1B forming the holes 33A, 33B (not shown) in the first and second optical components 1A, 1B. For example, the third and fourth optical components 7A, 7B may be manufactured from the removed sections or portions from the center of the first and second optical components 1A, 1B. In other embodiments, the third and fourth optical components 7A, 7B are manufactured with separate materials from the first and second optical components 1A, 1B.

In some embodiments, the third and fourth optical components 7A, 7B are configured to deflect a second optical path of light (indicated by arrows 8). In some embodiments, the second optical path 8 comprises a transmitted laser pulse. For example, the transmitted laser pulse may be used for a Light Detection and Ranging (LIDAR) sensor.

In some embodiments, the second optical path 8 comprises a separate optical channel (e.g., path) from the first optical path 2 for a multi-aperture optical sensor system (e.g., multi-camera imaging system). In some embodiments, different cameras, different transmit devices, and/or different optical component prism materials can be used to deflect the second optical path 8. The materials and optical coatings for the first and second optical components 1A, 1B and the third and fourth optical components 7A, 7B can be tailored to deflect any combinations of spectral frequencies for optical paths 2, 8.

In some embodiments, the first and second optical components 1A, 1B are directly coupled, mounted, or attached to (e.g., contacting) respective motors 3A, 3B of the first and second motor assemblies 17A, 17B. In certain embodiments the first and second optical components 1A, 1B are indirectly coupled, mounted, or attached to respective motors 3A, 3B of the first and second motor assemblies 17A, 17B via one or more interface materials, surfaces or structures (e.g., mounting bracket, metal piece, flange). For example, in some embodiments, mounting structures attached to each respective motor are coupled to posterior sides of the first and second optical components. The first and second optical components 1A, 1B can be directly or indirectly mechanically coupled to the respective motors 3A, 3B or motor assemblies 17A, 17B via screws, nuts and bolts, adhesives (e.g., epoxy, glue, room temperature vulcanization (RTV) silicon, etc.). In some embodiments, the first and second optical components 1A, 1B are monolithically formed with the hubs of the motor assemblies. In some embodiments, the first and second optical components 1A, 1B are flanged to the motor or motor assemblies. The third and fourth optical components 7A, 7B can be mounted to the outer ends of the motor assemblies 17A, 17B in a similar fashion as the first and second optical components 1A, 1B are mounted to the outer diameters.

In some embodiments, the motors 3A, 3B of the first and second motor assemblies 17A, 17B comprise ring motors. In some embodiments, the motors 3A, 3B are supported by a pair of bearings 4A, 4B (e.g., ball, roller) positioned between the tubes 5A, 5B and an inner portion of the motors 3A, 3B (e.g., mounted around the outer diameter of the tubes 5A, 5B). In some embodiments, the motors 3A, 3B are configured to rotate the first and second optical components 1A, 1B at constant velocity and equal and opposite angular rates. However, in certain embodiments, the first and second optical components 1A, 1B are configured to rotate or operate at constant or variable velocities, with equal or unequal relative velocities, and equal or opposite angular rates. The third and fourth optical components 7A, 7B can be configured to operate or rotate in a similar fashion as the first and second optical components 1A, 1B.

In certain embodiments described herein, the central hub mounting architecture or configuration (e.g., the inner diameters of the first and second optical components mounted and/or supported by the motor assemblies) reduces the linear speed (e.g., velocity) of the bearings for a given optical component angular rate, increasing the system or device allowable scan rate (e.g., since bearings are typically limited by the linear rate at the race) and/or reduces drag friction (e.g., required motor drive power) and mass of the bearings themselves assuming a fixed scan rate.

In some embodiments, the first and second optical components 1A, 1B comprise a pair of refractive Risley prisms. In some embodiments, the first and second optical components 1A, 1B comprise a pair of diffractive gratings. In some embodiments, the first and second optical components 1A, 1B are 6 inches in diameter. However, the optical components can comprise various sizes and diameters. The central hub mounting configuration of the optical components 1A, 1B allows for increased outer diameters of the optical components without increasing the size of the motors and bearings. Hence, the optical collection (or transmission) area of the scanning device can be increased without significant increase in size, weight, and power, especially if the encoder components 9A, 9B and 10A, 10B, are located at the inner hub as discussed below. Generally, the prisms are wedge-shaped but can comprise various other types of cross-sections. However, the prisms can be convex or concave, with spherical or aspheric surfaces, to add optical power to the scanning optical components. Generally the diffractive grating components are constant thickness. Optical power can be added by way of variation in the diffractive grating patterns on the constant thickness substrate. The pairs of prisms and/or gratings can be configured to be identical components, mirror images of each other, or altogether different from each other. In some embodiments, the pairs of prisms and/or gratings are of different sizes, shapes and/or materials.

In some embodiments, the first and/or second optical components 1A, 1B comprise a pair of volume-phase, volume polarization, or surface-relief diffractive gratings configured to deflect an optical path of light transmitted through the optical scanning device 15. For example, in some embodiments, rather than using a wedge-shaped refractive glass/crystal prism, the optical components can comprise a thin layer of photoresponsive material (e.g. dichromated gelatin, photopolymer, silver halide, etc.) or surface relief pattern to create a diffractive grating. Using such diffractive gratings on axially symmetric substrates (e.g. flat) can accomplish the same optical path deflection as wedge-shaped refractive glass/crystal prisms simplifying the balancing of the flat diffractive gratings about the rotational axis 13 as compared to wedge-shaped refractive glass/crystal prisms, as discussed further below. For example, imbalance generated by the non-axially symmetric refractive wedge prisms, which are thicker on one side, can be mitigated when using uniform thickness optical components such as diffractive gratings. Additionally, no counterweight is necessary as the optical components have a uniform thickness.

Similarly, in some embodiments, the third and fourth optical components 7A, 7B comprise a pair of Risley prisms. In some embodiments, the third and fourth optical components 7A, 7B comprises a pair of diffractive gratings. The third and fourth optical components 7A, 7B can comprise shapes, materials, gratings and/or configurations in similar fashion as the first and second optical components 1A, 1B described above.

In some embodiments, as illustrated in FIGS. 1A-1D, the optical scanning device 15 comprises a first rotational position encoder 9A, 10A. In some embodiments, the first rotational positional encoder comprises at least two pieces, an encoder read head or detector 9A and ring or disc 10A attachable to the first optical component 1A and/or motor assembly 17B. In some embodiments, the optical scanning device 15 comprises a second rotational position encoder 9B, 10B. The second rotational position encoder can comprise at least two pieces, an encoder read head or detector 9B and a graduated ring or disc 10B attachable to the second optical component 1B and/or motor assembly 17B. The first rotational position encoder 9A, 10A is configured to measure the clocking position of the first optical component 1 A and/or third optical component 7A. The second rotational encoder 9B, 10B is configured to measure the clocking position of the second optical component 1B and/or fourth optical component 7B. In some of the embodiments, each of the first and second optical components 1A, 1B incorporates a counterweight 11A, 11B configured to reduce system or device imbalance when the first and second optical components 1A, 1B are rotated. In some embodiments, the clocking positions of the first and second optical components 1A, 1B are offset relative to the clocking positions of the third and fourth optical components 7A, 7B respectively.

As discussed above, in some embodiments, the clocking position of the optical components can be measured via a two piece rotational position encoder 9A, 10A and 9B, 10B. The encoder read heads 9A, 9B may be mounted at the outer diameter of the first and second optical components 1A, 1B respectively as illustrated in FIGS. 1A-1D, at the motors 3A, 3B, or elsewhere within the system or device 15. The clocking orientation of the third and fourth optical components 7A, 7B can be aligned to or offset from the clocking orientation of the first and second optical components 1A, 1B respectively. In some embodiments, such an offset between the pointing orientations of the two optical paths 2, 8 compensates for a median target range delay for example, in a LIDAR system or for other sensor timing reasons. In this embodiment, the optical path for first and second optical components 1A, 1B is aligned with the optical path of the third and fourth optical components 7A, 7B at a fixed angular offset. In some embodiments, an offset between the first and second optical components 1A, 1B relative to the third and fourth optical components 7A, 7B may also provide a desired pointing offset between the two optical paths 2, 8 if different pointing directions for the two paths are desired.

As discussed above, in some embodiments, the two motors 3A, 3B can be driven by a power source (not shown) at constant velocities to provide a repeating Lissajous scanning pattern. In some embodiments, the motors 3A, 3B can be commanded through an arbitrary motion profile to provide alternative scanning paths. In certain embodiments, the optical components (e.g., the first and/or third components 1A, 7A relative to the second and/or fourth components 1B, 7B respectively) are rotated at equal and opposite angular rates to create a linear, back-and-forth, scan pattern. The optical scanner device 15 can comprise an input device, control circuit, controller, or control system (not shown) configured to control the motion or rotation of the optical components according to certain embodiments described herein.

In some embodiments, the optical scanning device may be driven with a single motor coupled to both optical elements to offer advantages in size, weight, and power. In this embodiment, drive coupling from the motor (e.g. direct drive, gears, belts, etc.) may be provided to each optical element 1A, 1B.

In some embodiments, the optical scanning device may comprise a single optical component 1A subassembly, with a single motor assembly 17A, and mounting bracket 6. In some embodiments, the single optical component 1A may include an additional optical component 7A mounted to the outer end of the motor assembly 17A to allow for a second addressable optical path 8. In this embodiment, the optical component 7A is rotatable concentric to optical component 1A. The embodiment with the single optical component 1A subassembly may achieve a conical optical scanning pattern. This single optical component architecture may be generally termed as a Palmer scanner (as opposed to the two element (e.g., 1A, 1B) Risley scanner described herein).

In some embodiments, with the optical components (1A, 1B, 7A, and/or 7B) comprising prisms, counterweights 11A, 11B may be required to reduce system or device imbalance during rotation. In some embodiments, two piece prisms using optical materials with different refractive indices may be used in place of single piece prisms to reduce the amount of the imbalance. As discussed above, in some embodiments, the use of diffractive gratings in place of prisms for the optical components removes the need for a refractive wedge-shape and/or dedicated counterweights for the optical scanning device and simplifies the assembly or device.

Figure 2A:
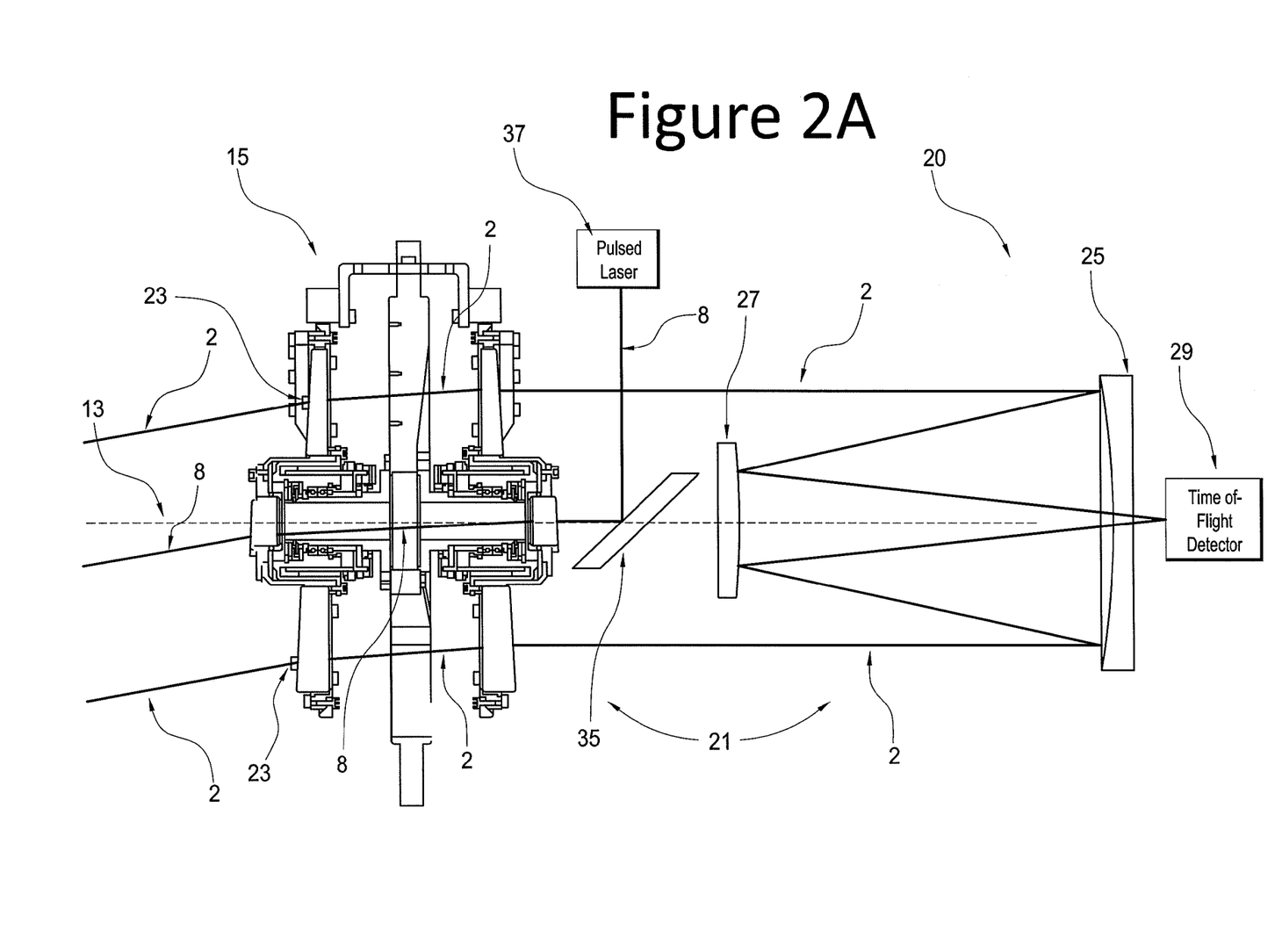
FIG. 2A schematically illustrates a side view of an example optical scanner system in accordance with certain embodiments described herein.
Figure 2B:
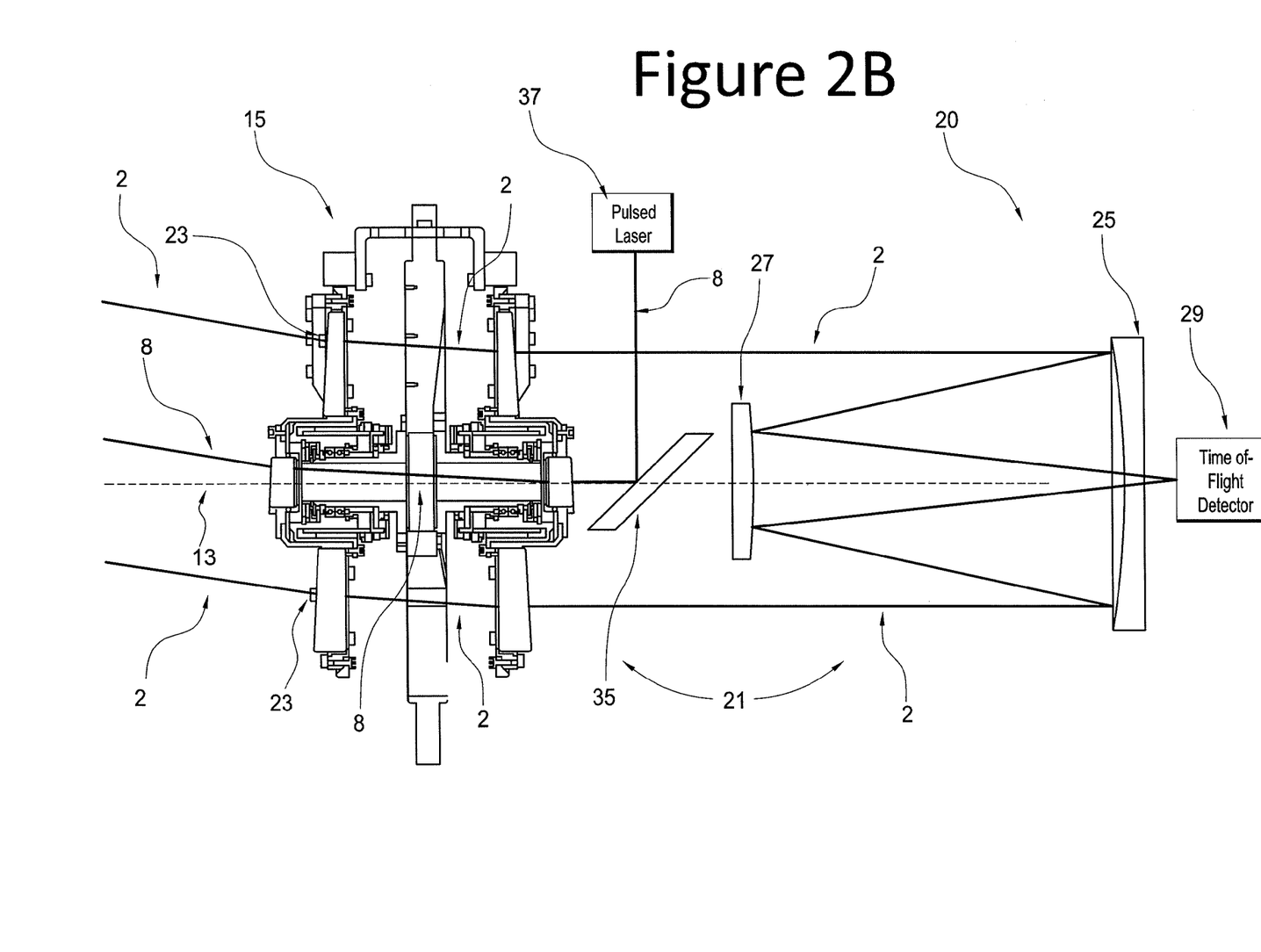
FIG. 2B schematically illustrates a side view of another example optical scanner system in accordance with certain embodiments described herein.

The optical scanning device 15 can be used, integrated or incorporated into various scanning, imaging or sensor systems. The systems include, but are not limited to Light Detection and Ranging (LIDAR), cameras, telescopes (e.g., reflecting, Newtonian), imaging, scanning, and other optical systems). FIG. 2 schematically illustrates a section view of an example optical scanning system 20 comprising an optical scanning device 15 as shown in FIGS. 1A-1D in accordance with certain embodiments described herein. The example optical scanning system 20 of FIG. 2 comprises a telescope 21. The telescope 21 comprises an aperture 23 (e.g., annulus, hole, opening), first optical surface 25, and a second optical surface 27. In some embodiments, the optical axis of the optical scanning device 15 may be offset from the optical axis of the telescope 21. In other embodiments, the optical scanning device 15 and the telescope 21 may share a common optical axis. The optical scanning system 20 further comprises a receiving device 29, a transmitting device 37, and the optical scanning device 15 positioned adjacent (e.g., in front, in back, next to, within) the aperture 23. The optical scanning device 15 can be configured as discussed above. The optical scanning device 15 comprises first and second optical components 1A, 1B configured to steer an optical path of light (as indicated by lines 2) received within the aperture 23 of the telescope 21 to the first optical surface 25 such that the optical path 2 can be deflected by the first optical surface 25 to the second optical surface 27. The optical path 2 is focused by the second optical surface 27 towards the receiving device 29. The first and second optical components 1A, 1B are configured to rotate about a common axis (as indicated by dashed line 13) extending through the center of each of the first and second optical components 1A, 1B. Each of the first and second optical components 1A, 1B are further configured to be mounted to first and second motor assemblies 17A, 17B partially positioned within holes 33A, 33B extending through the center of each of the first and second optical components 1A, 1B.

In some embodiments, the optical scanning device 15 of the optical scanning system 20 comprises third and fourth optical components 7A, 7B mounted to respective outer ends of the first and second motor assemblies 17A, 17B extending through the first and second optical components such that the third and fourth optical components 7A, 7B are rotatable concentrically relative to the first and second optical components 1A, 1B. The third and fourth optical components 7A, 7B are configured to steer an optical path of light (as indicated by line 8) transmitted from the transmitting device 37 of the optical scanning system 20 deflected to the third and fourth optical components 7A, 7B from a third optical surface 35.

In some embodiments, because the third and fourth optical components rotate concentrically around the same axis as the first and second optical components, a smaller aperture 23 may be desirable than if the first and second optical components were used to steer or direct the optical path of both transmitted and received light. As discussed above, the third and fourth optical components can steer the optical path of the transmitted light and the first and second components can steer the optical path of the received light or vice versa. In some embodiments, this type of concentric path configuration substantially prevents or eliminates parallax problems. In some embodiments, the concentric rotation of the optical components allows the transmitted and received optical paths to be steered or deflected at different angles by the optical components.

In some embodiments, the optical surfaces (25, 27, 35) of the optical scanning system 20 comprise mirrors and/or lenses (e.g. reflective telescope, catadioptric telescope, refractive lens, or catadioptric lens, etc.). In some embodiments, the receiving device 29 comprises a detector (e.g., CCD, CMOS, APD array, etc.) and the transmitting device 37 comprises a laser pulse transmitting device.

Although certain configurations and examples are disclosed herein, the subject matter extends beyond the examples in the specifically disclosed configurations to other alternative configurations and/or uses, and to modifications and equivalents thereof. Thus, the scope of the claims appended hereto is not limited by any of the particular configurations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain configurations; however, the order of description should not be construed to imply that these operations are order dependent. Additionally, the structures, systems, and/or devices described herein may be embodied as integrated components or as separate components. For purposes of comparing various configurations, certain aspects and advantages of these configurations are described. Not necessarily all such aspects or advantages are achieved by any particular configuration. Thus, for example, various configurations may be carried out in a manner that achieves or optimizes one advantage or group of advantages as taught herein without necessarily achieving other aspects or advantages as may also be taught or suggested herein.

Discussion of the various configurations herein has generally followed the configurations schematically illustrated in the figures. However, it is contemplated that the particular features, structures, or characteristics of any configurations discussed herein may be combined in any suitable manner in one or more separate configurations not expressly illustrated or described. In many cases, structures that are described or illustrated as unitary or contiguous can be separated while still performing the function(s) of the unitary structure. In many instances, structures that are described or illustrated as separate can be joined or combined while still performing the function(s) of the separated structures.

Various configurations have been described above. Although the invention has been described with reference to these specific configurations, the descriptions are intended to be illustrative and are not intended to be limiting. Various modifications and applications may occur to those skilled in the art without departing from the true spirit and scope of the invention as defined in the appended claims.

What is claimed is:
1. An optical scanning device comprising:
a first rotatable optical component;
a second rotatable optical component,
wherein the first and second optical components are configured to rotate about a common optical axis, the first and second optical components further configured to deflect an optical path of light transmitted or received through the optical scanning device;

a mounting bracket positioned between the first and second optical components; and first and second motor assemblies configured to rotate the corresponding first and second optical components about the optical axis independently of each other, each of the first and second motor assemblies comprising a motor supported by an outer perimeter of a tube, wherein each of the tubes is fixed relative to the first and second optical components, each of the tubes comprising an inner end supported by the mounting bracket, wherein an inner portion of each of the first and second optical components is mounted to an outer portion of the corresponding first and second motor assemblies such that the optical axis is configured to extend through the center of the first and second optical components and tubes.

2. The optical scanning device of claim 1, wherein circular holes are formed at a center of each of the first and second optical components such that an inner diameter of each of the first and second optical components formed by the holes is configured to be mounted to and supported by an outer diameter of the corresponding motors of the first and second motor assemblies.

3. The optical scanning device of claim 2, wherein each of the holes extend through the first and second optical components from a posterior to an anterior side of the first and second optical components.

4. The optical scanning device of claim 3, wherein the motors of the first and second motor assemblies comprise ring motors configured to rotate the first and second optical components independently.

5. The optical scanning device of claim 3, further comprising third and fourth optical components mounted to outer ends of the motor assemblies opposite the inner ends supported by the mounting bracket such that the third and fourth optical components are rotatable concentrically to the first and second optical components.

6. The optical scanning device of claim 5, wherein the first and second optical components comprise a pair of Risley prisms.

7. The optical scanning device of claim 5, wherein the first and second optical components comprises a pair of diffractive gratings.

8. The optical scanning device of claim 5, wherein the third and fourth optical components comprise materials removed from the each of the first and second optical components forming the holes in the first and second optical components.

9. The optical scanning device of claim 5, wherein the third and fourth optical components are configured to deflect a second optical path.

10. The optical scanning device of claim 9, wherein the second optical path comprises a transmitted laser pulse.

11. The optical scanning device of claim 9, wherein the second optical path comprises a separate channel from the first optical path for a multi-aperture optical sensor system.

12. The optical scanning device of claim 6, wherein the third and fourth optical components comprise a pair of Risley prisms.

13. The optical scanning device of claim 6, wherein the third and fourth optical components comprises a pair of diffractive gratings.

14. The optical scanning device of claim 6 comprising first and second rotational position encoders configured to measure the clocking position of the optical components.

15. The optical scanning device of claim 6, wherein each of the first and second optical components comprise counterweights configured to reduce system imbalance when the first and second optical components are rotated.

16. The optical scanning device of claim 14, wherein the clocking positions of the first and second optical components are offset from the clocking position of the third and fourth optical components respectively.

17. An optical scanning system comprising:

a telescope comprising an aperture, first optical surface, and second optical surface;

a receiving device;

a transmitting device;

an optical scanning device positioned adjacent the aperture, wherein the optical scanning device comprises first and second optical components configured to steer an optical path received within the aperture of the telescope to the first optical surface such that the optical path is deflected by the first optical surface to the second optical surface and focused by the second optical surface towards the receiving device, wherein the first and second optical components are configured to rotate about a common axis extending through the center of each of the first and second optical components, each of the first and second optical components further configured to be mounted to first and second motor assemblies partially positioned within holes extending through the center of each of the first and second optical components.

18. The optical scanning system of claim 17, wherein the optical scanning device comprises third and fourth optical components mounted to respective outer ends of the first and second motor assemblies extending through the first and second optical components such that the third and fourth optical components are rotatable concentrically relative to the first and second optical components, wherein the third and fourth optical components are configured to steer an optical path of light transmitted from the transmitting device of the optical scanning system deflected to the third and fourth optical components from a third optical surface.

19. The optical scanning system of claim 18, wherein the optical surfaces comprise mirrors.

20. The optical scanning system of claim 19, wherein the receiving device comprises a detector and the transmitting device comprises a laser pulse transmitting device.

21. An optical scanning device comprising:

a first rotatable optical component, wherein the first optical component is configured to rotate about an optical axis, the first optical component further configured to deflect an optical path of light transmitted or received through the optical scanning device;

a mounting bracket coupled to the first optical component; and a first motor assembly configured to rotate the first optical component about the optical axis, the first motor assembly comprising a motor supported by an outer perimeter of a tube, wherein the tube is fixed relative to the first optical component, the tube comprising an inner end supported by the mounting bracket, wherein the inner portion of the first optical component is mounted to an outer portion of the corresponding first motor assembly such that the optical axis is configured to extend through the center of the first optical component and the tube.

22. The optical scanning device of claim 21, further comprising a second rotatable optical component configured to deflect a second optical path of light transmitted or received through the optical scanning device, wherein the mounting bracket is positioned between the first and second optical component, wherein the first motor assembly is further configured to rotate the first and second optical components about the optical axis independently of each other.

23. The optical scanning device of claim 22, wherein the second rotatable optical component is mounted to the outer end of the first motor assembly opposite the inner end supported by the mounting bracket such that the second optical component is rotatable concentrically to the first optical component.

24. The optical scanning device of claim 21, further comprising:
   a telescope comprising an aperture, first optical surface, and second optical surface; and
   a receiving device,
   wherein first optical component is further configured to steer an optical path received within the aperture of the telescope to the first optical surface such that the optical path is deflected by the first optical surface to the second optical surface and focused by the second optical surface towards the receiving device.

25. The optical scanning device of claim 22, further comprising:
   a telescope comprising an aperture, first optical surface, and second optical surface; and
   a receiving device;
   wherein the first and second optical components are further configured to steer an optical path received within the aperture of the telescope to the first optical surface such that the optical path is deflected by the first optical surface to the second optical surface and focused by the second optical surface towards the receiving device.

* * * * *